United States Patent
Beckett et al.

(10) Patent No.: US 10,437,762 B2
(45) Date of Patent: Oct. 8, 2019

(54) PARTITIONED INTERCONNECT SLOT FOR INTER-PROCESSOR OPERATION

(71) Applicant: Dell Products, L.P., Round Rock, TX (US)

(72) Inventors: John Christopher Beckett, Georgetown, TX (US); Rich M. Hernandez, Round Rock, TX (US); Robert Wayne Hormuth, Cedar Park, TX (US); Mukund P. Khatri, Austin, TX (US); Yogesh Varma, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/872,100

(22) Filed: Jan. 16, 2018

(65) Prior Publication Data

US 2019/0220428 A1    Jul. 18, 2019

(51) Int. Cl.
| G06F 13/38 | (2006.01) |
| G06F 9/4401 | (2018.01) |
| G06F 13/40 | (2006.01) |
| G06F 13/42 | (2006.01) |

(52) U.S. Cl.
CPC .......... *G06F 13/385* (2013.01); *G06F 9/4406* (2013.01); *G06F 13/4068* (2013.01); *G06F 13/4282* (2013.01); *G06F 2213/0026* (2013.01); *G06F 2213/0042* (2013.01)

(58) Field of Classification Search
CPC .................................................. G06F 13/4022
See application file for complete search history.

(56) References Cited

U.S. PATENT DOCUMENTS

| 7,058,738 B2 * | 6/2006 | Stufflebeam, Jr. ......................... G06F 13/4022 710/104 |
| 8,335,884 B2 * | 12/2012 | Hamadani ........... G06F 13/4022 710/316 |
| 8,503,468 B2 * | 8/2013 | Akyol ................... G06F 13/385 370/389 |

* cited by examiner

*Primary Examiner* — Henry Tsai
*Assistant Examiner* — Juanito Borromeo
(74) *Attorney, Agent, or Firm* — Fogarty LLP

(57) ABSTRACT

Systems and methods for providing a partitioned interconnect slot for inter-processor operation. In an illustrative, non-limiting embodiment, an Information Handling System (IHS) may include: a processor comprising a first core and a second core; and a memory coupled to the processor, the memory having program instructions stored thereon that, upon execution, cause the IHS to enable an Input/Output (I/O) device to communicate directly with the first core and the second core utilizing a single interconnect slot.

14 Claims, 6 Drawing Sheets

US 10,437,762 B2

PARTITIONED INTERCONNECT SLOT FOR INTER-PROCESSOR OPERATION

FIELD

The present disclosure generally relates to Information Handling Systems (IHSs), and, more particularly, to a partitioned interconnect slot for inter-processor operation.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

SUMMARY

Embodiments of systems and methods for providing a partitioned interconnect slot for inter-processor operation are described. In an illustrative, non-limiting embodiment, an Information Handling System (IHS) comprises: a processor comprising a first core and a second core; and a memory coupled to the processor, the memory having program instructions stored thereon that, upon execution, cause the IHS to enable an Input/Output (I/O) device to communicate directly with the first core and the second core utilizing a single interconnect slot. In some implementations, the first and second cores may access a single I/O device coupled to the single interconnect slot.

The program instructions, upon execution, may cause the IHS to enable the first core and the second core to communicate with the I/O device via the single interconnect slot in the absence of link traversal operations between the first core and the second core. The first core and the second core may share a non-volatile memory (NVM) bridge adapter. The program instructions, upon execution, may further cause the IHS to reduce latency of communication between (a) the first and second cores and (b) the NVM bridge adapter.

In some cases, the IHS may include a Basic Input/Output System (BIOS) coupled to the processor, the BIOS having program instructions stored thereon that, upon execution, cause the IHS to identify a type of the single interconnect slot. Additionally or alternatively, the BIOS may have program instructions stored thereon that, upon execution, cause the IHS to associate two or more interconnect slot entries with the single interconnect slot.

A first interconnect slot entry may include a first proximity domain construct that allows the first core to spawn a first interrupt or thread directed to a first portion of the single interconnect slot, and a second interconnect slot entry may include a second proximity domain construct that allows the second core to spawn a second interrupt or thread directed to a second portion of the single interconnect slot.

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
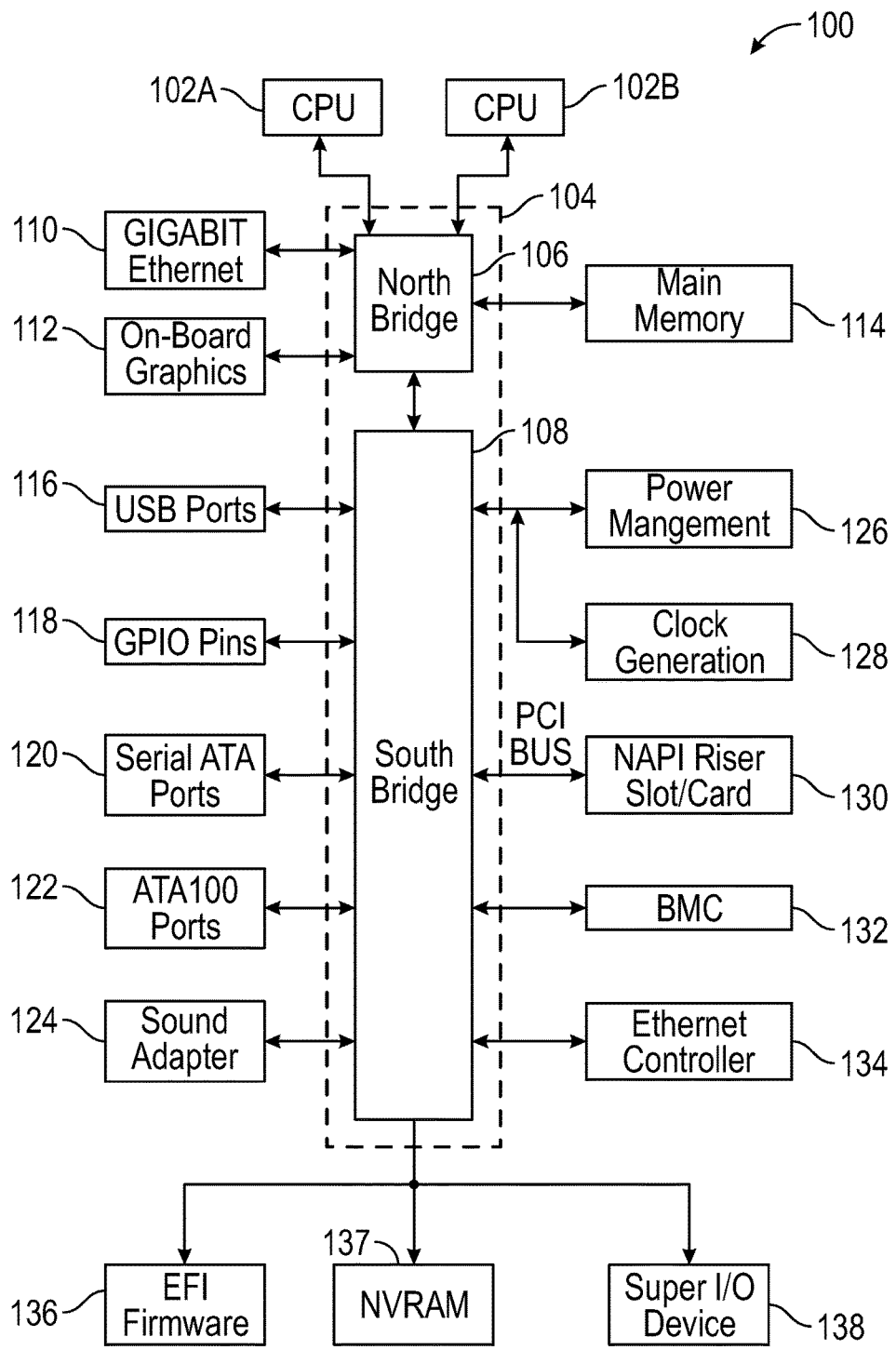
FIG. 1 is a block diagram of an example of an Information Handling System (IHS) configured to implement systems and methods according to some embodiments.

Embodiments described herein provide a partitioned interconnect slot for inter-processor operation. In a multi-processor Information Handling System (IHS) an Input/Output (I/O) device (e.g., network interface card, storage controller, etc.) may be connected to one or more Central Processing Units (CPUs), CPU packages, CPU sockets, or CPU cores, via an interconnect link (e.g., Peripheral Component Interconnect Express or "PCIe"). In this context, Non-Uniform Memory Access (NUMA) is a memory design used in multiprocessing, where the memory access time depends on the location the I/O device's memory relative to the CPU.

Under NUMA, a CPU can access its own local memory faster than non-local memory (memory local to another CPU or memory shared between CPUs). When I/O device-driven execution threads are scheduled on available CPUs without regard to NUMA I/O locality, however, the I/O traffic may need to cross NUMA nodes using the inter-socket communication link (e.g., INTEL Ultra Path Interconnect (UPI) interface between CPUs).

Some CPUs may include technologies, such as Data Direct I/O Technology (DDIO), that can boost the performance and throughput for I/O device local to a CPU. Constructs such as Advanced Configuration and Power Interface (ACPI) proximity domain (PXM), part of a System Resource Affinity Table (SRAT), help direct Operating System (OS) and device drivers to land on the local CPU that has the I/O to align to this enhanced I/O performance.

The foregoing techniques, however, are not possible in cases where two or more CPU cores need to access one particular I/O device—e.g., a device inserted into a PCIe slot off of CPU 1, and half of the threads end up with remote I/O accesses. The remote NUMA node traffic has a significant performance penalty when threads, interrupts, and/or memory access are remote from the CPU to which the PCIe I/O device is connected.

Under non-NUMA I/O aligned conditions, throughput can be reduced by as much as 53%, and latency increased two-fold, as inter-socket communication links become saturated. To avoid such high non-NUMA/remote I/O penalties, customers use multiple dedicated PCIe I/O, Non-Volatile Memory Express (NVMe), or compute adapter, connected directly to each CPU socket's PCIe port. But, in dense multi-socket systems, dedicated PCIe slots are not always available. Moreover, socket-dedicated solutions have additional cost and power consumption.

To address these, and other problems, a partitioned interconnect slot solution according to systems and methods described herein may allow an I/O device to connect directly with multiple upstream CPU sockets utilizing only a single interconnect slot. Such partitioned slot and/or card has been named NUMA Aware Partitioned I/O (NAPI) system. In various implementations, a NAPI riser solution may entirely bypass inter-CPU socket link traversal and associated overheads such as the NUMA latency penalty. A NAPI riser solution may also help enable DDIO performance benefit to each CPU socket from a single adapter. In a NAPI riser system, PCIe lanes may be balanced across CPU sockets.

The term "riser card," as used herein, refers to a Printed Circuit Board (PCB) that receives signal lines via a bus using a single connector (usually an edge connector) on a motherboard, and distributes those signals via dedicated connectors on the card. Riser cards are often used to add expansion cards to an IHS enclosed in a low-profile chassis where the height of the chassis does not allow a perpendicular placement of a full-height expansion card. As such, a riser card may be plugged into a single interconnect slot to then provide additional slots for adapter cards. Because a riser card physically rises above the motherboard, additional adapters may be connected to the IHS in a parallel direction with respect to the motherboard, hence saving space within the IHS' chassis.

A NAPI riser system may further enable sockets sharing a NVMe bridge adapter enabling local low latency storage attached to each NUMA node. A NAPI riser system can also enable the sharing of Graphic Processing Unit (GPU) and/or Field Programmable Gate Array (FPGA)-type accelerators between two or more CPU sockets. A NAPI riser solution may further enable low-latency NVMe storage attached directly and locally to each NUMA node, using a ×4 or ×8 or ×16 bifurcatable adapter. Systems and methods described herein further allow for set of NVMes to be bifurcated and split up across two or more CPU sockets.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

FIG. 1 shows an example of an IHS configured to implement systems and methods described herein. It should be appreciated that although certain embodiments described herein may be discussed in the context of a desktop or server computer, other embodiments may be utilized with virtually any type of IHS.

Particularly, the IHS includes a system planar, baseboard, or motherboard 100, which is a printed circuit board (PCB) to which components or devices are mounted to by way of a bus or other electrical communication path. In some cases, first and second Central Processing Unit (CPUs), CPU cores, CPU packages, CPU sockets, or CPU cores 102A-B operate in conjunction with a chipset 104. CPUs 102A-B (collectively referred to as CPU 102 below for sake of simplicity of explanation) may comprise a processor that performs arithmetic and logic necessary for the operation of the IHS.

Chipset 104 includes northbridge 106 and southbridge 108. Northbridge 106 provides an interface between CPU 102 and the remainder of the IHS. Northbridge 106 also provides an interface to a random access memory (RAM) used as main memory 114 in the IHS and, possibly, to on-board graphics adapter 112. Northbridge 106 may also be configured to provide networking operations through Ethernet adapter 110. Ethernet adapter 110 is capable of connecting the IHS to another IHS (e.g., a remotely located IHS) via a network. Connections which may be made by network adapter 110 may include local area network (LAN) or wide area network (WAN) connections. Northbridge 106 is also coupled to southbridge 108.

Southbridge 108 is responsible for controlling many of the input/output (I/O) operations of the IHS. In particular, southbridge 108 may provide one or more universal serial bus (USB) ports 116, sound adapter 124, Ethernet controller 134, and one or more general purpose input/output (GPIO) pins 118. Southbridge 108 may further provide a Peripheral Component Interconnect Express (PCIe) bus for interfacing peripheral card devices through PCIe slot(s) 130.

In some embodiments, southbridge 108 may also provide baseboard management controller (BMC) 132 for use in managing the various components of the IHS. Power management circuitry 126 and clock generation circuitry 128 may also be utilized during operation of southbridge 108.

Additionally, southbridge 108 is configured to provide one or more interfaces for connecting mass storage devices to the IHS. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS and allocation of resources. An application program is software that runs on top of the OS and uses computer resources made available through the OS to perform application-specific tasks desired by the user.

Mass storage devices may be connected to southbridge 108, such that their associated computer-readable media provide non-volatile storage for the IHS. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS and to transfer information between elements within the IHS. BIOS/firmware 136 comprises firmware compatible with the Extensible Firmware Interface (EFI) Specification and Framework.

The LPC interface may also be utilized to connect NVRAM 137 to the IHS. NVRAM 137 may be utilized by BIOS/firmware 136 to store configuration data for the IHS. In other embodiments, configuration data for the IHS may be stored on the same NVRAM 137 as BIOS/firmware 136.

BMC 132 may include non-volatile memory having program instructions stored thereon that enable remote management of the IHS. For example, BMC 132 may enable a user to discover, configure, and manage the IHS, setup configuration options, resolve and administer hardware or software problems, etc. Additionally or alternatively, BMC 132 may include one or more firmware volumes, each volume having one or more firmware files used by the BIOS' firmware interface to initialize and test components of the IHS.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within the IHS from the factory.

It should be appreciated that, in other embodiments, the IHS may comprise other types of computing devices, including hand-held computers, embedded computer systems, personal digital assistants, and other types of computing devices. It is also contemplated that the IHS may not include all of the components shown in FIG. 1, may include other components that are not explicitly shown in FIG. 1, or may utilize a different architecture.

Figure 2:
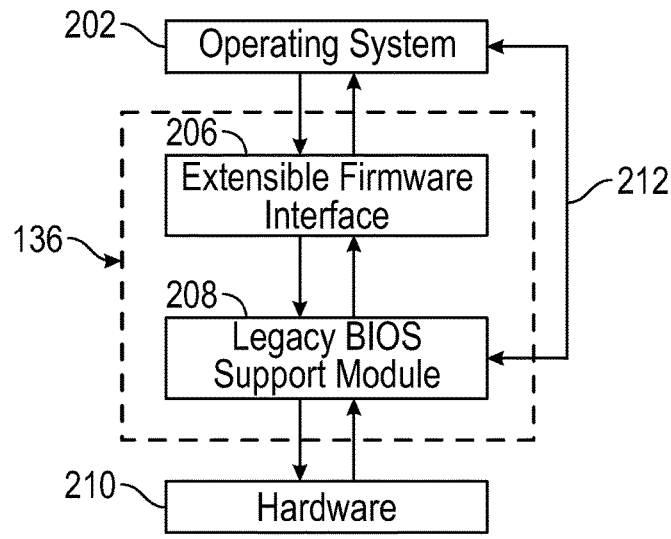
FIGS. 2 and 3 are block diagrams of examples of aspects of Basic Input/Output (BIOS) or Extensible Firmware Interface (EFI) firmware configured to implement systems and methods according to some embodiments.

Referring now to FIG. 2, examples of aspects of an EFI environment created by BIOS/firmware 136 of the IHS are described. As shown, BIOS/firmware 136 comprises firmware compatible with the EFI Specification from INTEL CORPORATION or from the UEFI FORUM. The EFI Specification describes an interface between OS 202 and BIOS/firmware 136. Particularly, the EFI Specification defines the interface that BIOS/firmware 136 implements and the interface that OS 202 may use in booting.

According to an implementation of EFI, both EFI 206 and legacy BIOS support module 208 may be present in BIOS/firmware 136. This allows the IHS to support both firmware interfaces. In order to provide this, interface 212 may be used by legacy OSs and applications. Additional details regarding the architecture and operation of the EFI 206 are provided below with respect to FIG. 3.

Figure 3:
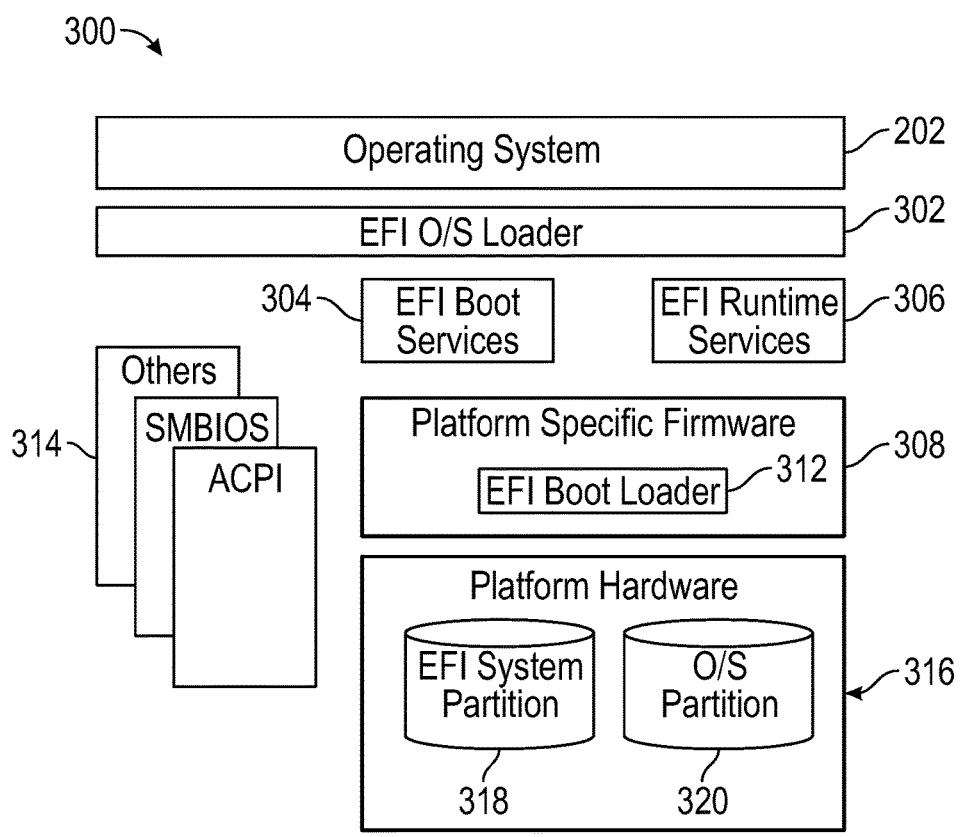

FIG. 3 provides additional details regarding an EFI Specification-compliant system 300 utilized to provide an operating environment for facilitate initialization and reconfiguration of replacement motherboards. As shown, system 300 includes platform hardware 316 and OS 202. Platform firmware 308 may retrieve an OS image from EFI system partition 318 using an EFI O/S loader 302. EFI system partition 318 may be an architecturally shareable system partition. As such, EFI system partition 318 defines a partition and file system that are designed to allow safe sharing of mass storage between multiple vendors. O/S partition 320 may also be utilized.

Once started, EFI O/S loader 302 continues to boot the complete OS 202. In doing so, EFI O/S loader 302 may use EFI boot services 304 and interface to other supported specifications to survey, comprehend, and initialize the various platform components and the operating system software that manages them. Thus, interfaces 314 from other specifications may also be present on system 300. For example, the Advanced Configuration and Power Management Interface (ACPI) and the System Management BIOS (SMBIOS) specifications may be supported.

EFI boot services 304 provide interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to EFI-defined runtime and boot services.

Various program modules provide the boot and runtime services. These program modules may be loaded by the EFI boot loader 312 at system boot time. EFI boot loader 312 is a component in the EFI firmware that determines which program modules should be explicitly loaded and when. Once the EFI firmware is initialized, it passes control to boot loader 312. Boot loader 312 is then responsible for determining which of the program modules to load and in what order.

Figure 4:
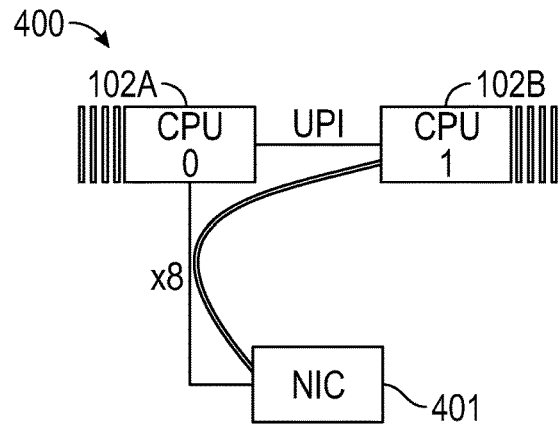
FIGS. 4 and 5 are diagrams illustrating conventional multi-processor technologies.
Figure 5:
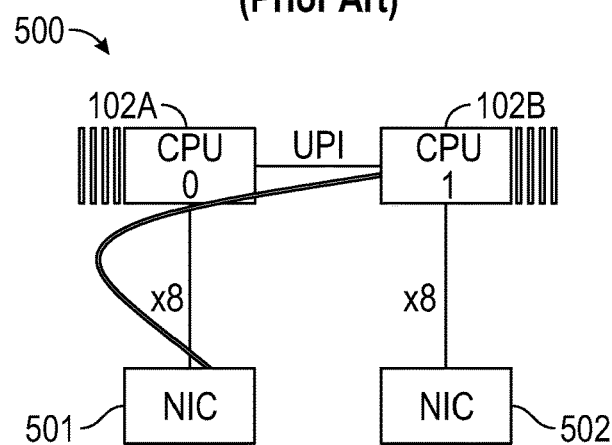

FIGS. 4 and 5 are diagrams illustrating multi-processor technologies that present one or more of the aforementioned problems that result from the use of conventional technologies. Particularly, in FIG. 4, system 400 shows CPU packages, CPU sockets, or CPU cores 102A-B coupled to each other via a UPI inter-processor traversal link, and NIC 401 (or another PCIe device) is accessible to CPU 102B only via the UPI link; because only CPU 102A has direct access to NIC 401 via the PCIe bus. In FIG. 5, system 500 shows a situation where CPU 102A has direct access to NIC 501, and CPU 102B has direct access to NIC 502. Here, two NICs 501-502 are used, thus taking up two PCIe slots—and still, traffic from CPU 102B directed to NIC 501 invariably traverses the inter-processor UPI link.

Figure 6:
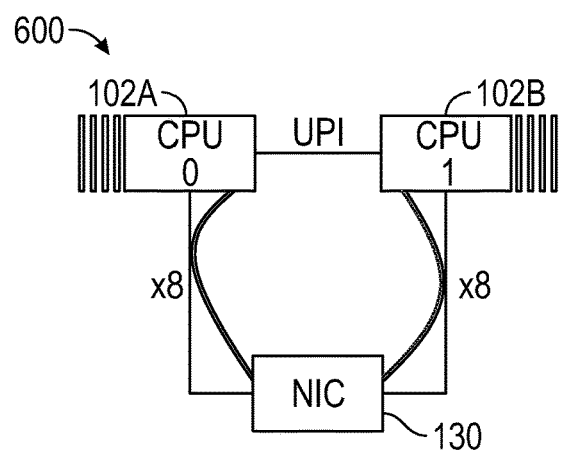
FIG. 6 is a block diagram of an example of a multi-processor system configured to reduce or avoid inter-processor traffic, according to some embodiments.

FIG. 6 is a block diagram of an example of multi-processor system 600 configured to reduce or avoid inter-processor traffic. In some embodiments, multi-processor system 600 enables both CPU 102A and CPU 102B to access NIC 130 inserted in a single interconnect slot using a partitioned interconnect bus for each CPU, therefore avoiding or reducing performance penalties associated with traversing the UPI link between CPUs 102A-B, in contrast with the conventional systems of FIGS. 4 and 5.

Figure 7:
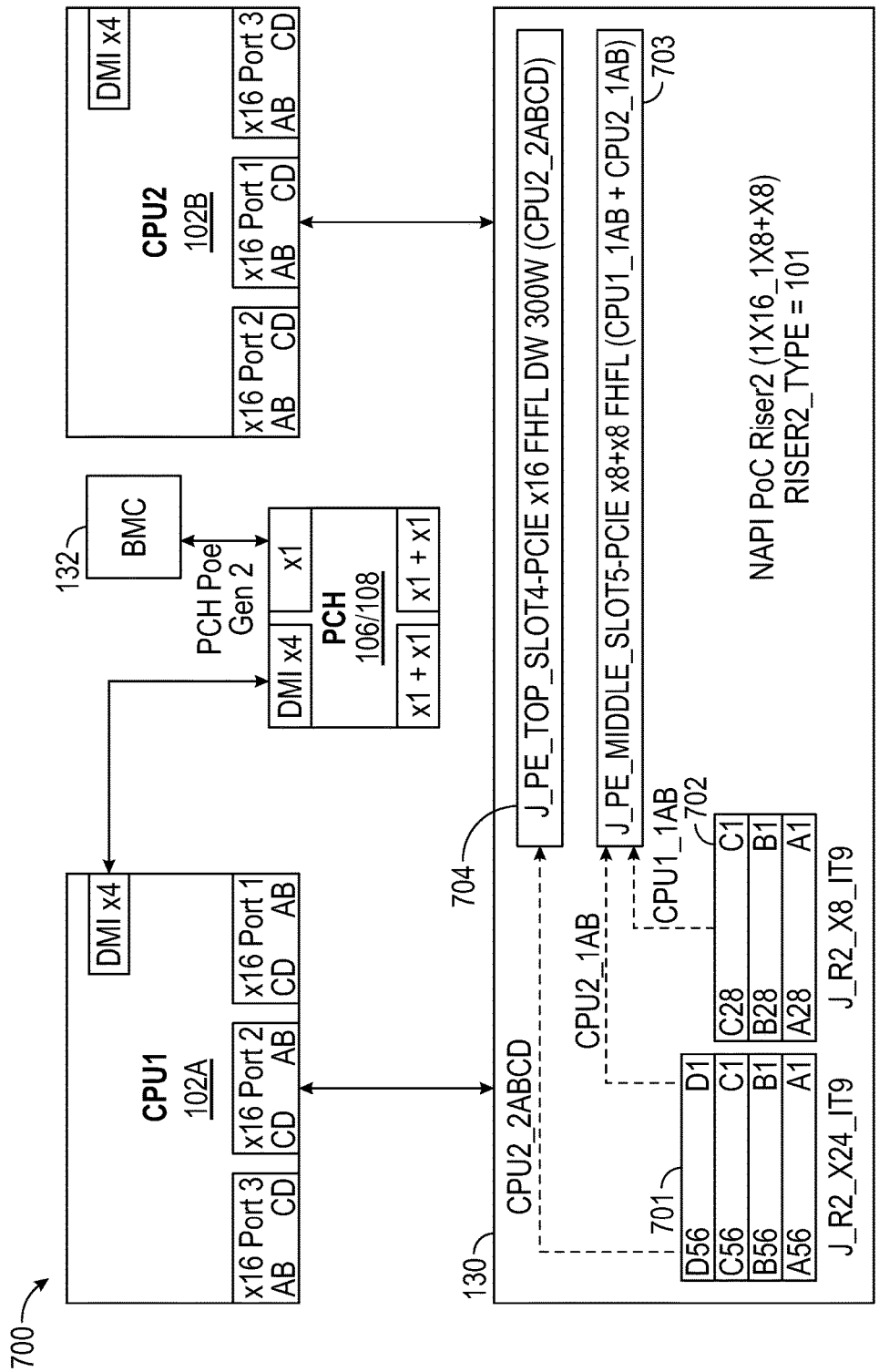
FIG. 7 is a block diagram of an example of a partitioned interconnect slot system according to some embodiments.

To illustrate an implementation of multi-processor system 600, FIG. 7 is a block diagram of an example of a partitioned interconnect slot system 700 according to some embodiments. It should be noted that elements 701-704 show various types of riser-to-planar interconnect as riser adapter card slot connectors; yet connector names used here are examples only, and similar techniques may be applied to any other suitable type of interconnect or slot connector.

As shown, CPUs 102A-B are independently coupled to a respective portion of a partitioned interconnect slot 703 of NAPI riser card 130. Partitioned interconnect slot 703 of riser card 130 (in this case, a 1×16 physical slot is partitioned into two 1×8 logical slots) splits communications between CPU 102B and connector portion 701, apart from communications between CPU 102A and connector portion 702. Connector portions 701 and 702 may allow CPU 102A and CPU 102B to access riser card 130 using a single, partitioned interconnect slot 703 without traversing any interconnect or direct link between CPUs 102A-B.

In some cases, CPU 102A may additionally be coupled to Platform Controller Hub (PCH) 106/108, which in turn is coupled to BMC 132. Moreover, a second interconnect slot 704 of riser card 130 may remain un-partitioned and dedicated to traffic to/from CPU 102B; such that NUMA traffic between CPU 102A and 704 still uses an interconnect or direct link between CPUs 102A-B to access another PCIe device, this time using a interconnect or direct link between CPUs 102A-B.

Figure 8:
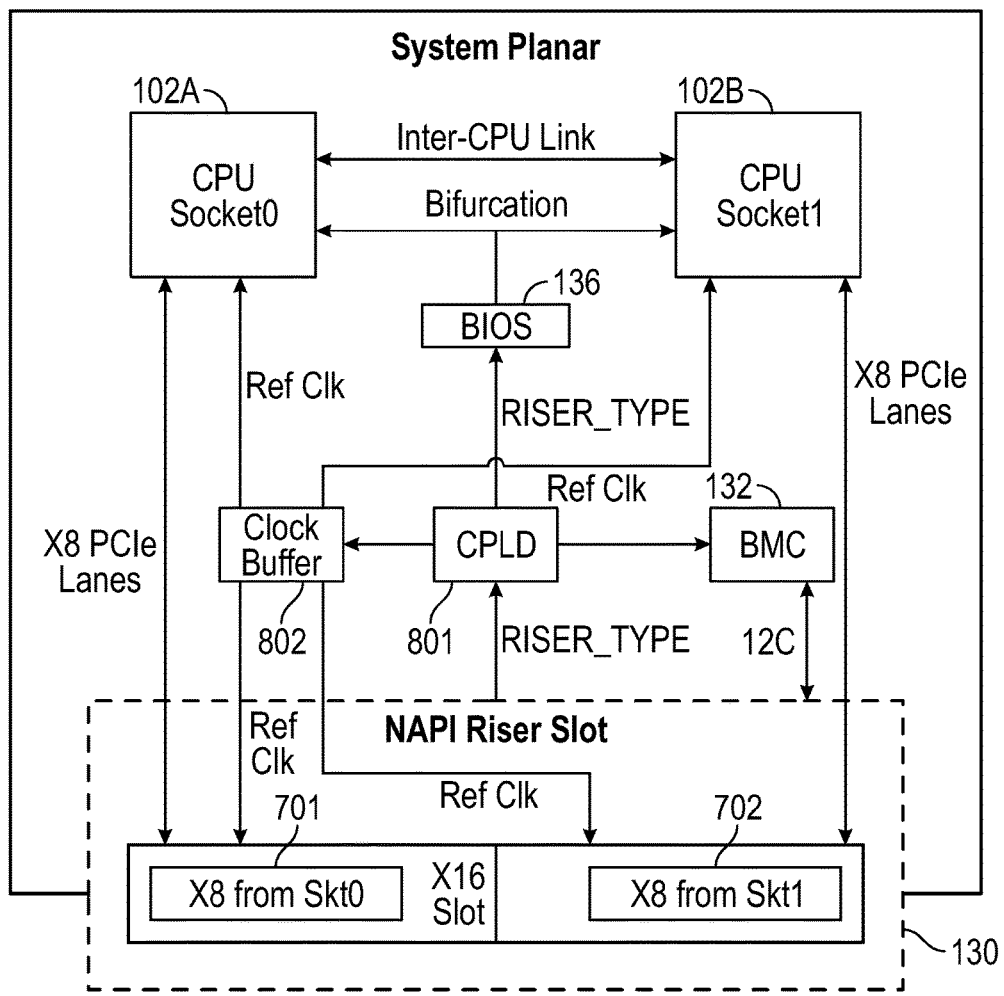
FIG. 8 is a block diagram of an example of a Non-Uniform Memory Access (NUMA) Aware Partitioned I/O (NAPI) system according to some embodiments.

FIG. 8 is a block diagram of an example of NAPI system 800 according to some embodiments. In this example, when NAPI execution slot riser 130 is populated in the planar PCIe riser connector, a RISER_TYPE sideband signal indicates its presence to a controller, FPGA, or complex programmable logic device (CPLD) 801.

CPLD 801 in turn indicates bifurcation of a single interconnect slot of NAPI riser 130 into two parts: partition 701 (for CPU 102A) and partition 702 (for CPU 102B) to BIOS 136 and BMC 132. BIOS 136 bifurcates CPU PCIe lanes to match with that of NAPI riser 130. BIOS 136 also allocates memory mapped I/O resources. PCIe slot reference clock and other sideband signals may be enabled and disabled by CPLD 801. BIOS 136 also provides NUMA I/O hints to the OS being executed by the IHS, per device, for example, using ACPI_PXM for interrupt handling. Particularly, NUMA I/O hints are provided by the BIOS via ACPI_PXM for each PCIe device to allow the OS to determine which CPU socket the device is local to. This allows the OS to drive interrupts and schedule threads using these devices to cores local to the device automatically.

When a conventional (non-NAPI) riser is populated in the same planar slot 130, CPLD 801 appropriately triggers BIOS 136 and sidebands to activate two ×8 slots connected to two CPU sockets 102A-B.

A CPLD sideband handler may be triggered by a NAPI riser type bit encoding. For a single node implementation, for example, sideband signals (1)-(4) may be handled as follows:

(1) 100 MHz Reference Clock: In some cases, NAPI riser 130 may use two pins for a reference clock (RefClk) differential pair signals per ×8 PCIe partition. As the partition counts increase, a SRNS/SRIS (Separate Reference Clock NO/Separate Spread) clocking mechanism may be used to save pins and routing.

(2) $I^2C$—NAPI riser 130 may also use one $I^2C$ bus (with System Management Bus (SMB) clock and data connections SMDAT/SMCLK) per adapter.

(3) PERST#—One PERST# sideband signal per host may be provided to the NAPI riser slot, and this signal may be used by the NAPI adapter as Fundamental Reset.

(4) WAKE#—NAPI may use a WAKE# sideband signal as a link wakeup mechanisms to signal to the IHS to re-establish power and reference clocks to the components within its domain. A WAKE# enabled NAPI PCIe end-point (driven by network side host) has ability to drive open-drain WAKE# signal low until main power is restored and the fundamental reset signal (PERST#) is inactive.

To illustrate, in some cases a single host with two CPU sockets may receive the following sideband signals:

| Sideband Name | Pins | NAPI Slot Pins | Comments |
| --- | --- | --- | --- |
| RefClk (100 Mhz) | 2 × per NAPI Partition | A32/A33 A13/A14 | Works with current PE clocking architecture |
| PERST# | 1 per host | A11 | Reset all partitions as one adapter |
| SMCLK + SMDATA (I2C) | 1 per host | B5 + B6 | Manages all partitions as one adapter |
| WAKE# | 1 per host | B11 | All partitions can be wired-OR to WAKE# |
| NAPI_MODE | 1 per slot | B82 | Reserved pin in spec, indicates if the adapter supports NAPI mode |
| RISER_TYPE | ⅔ per system | Varies | Triggers CPLD logic for execution-balanced IO slot riser support |

A conventional, non-NAPI adapter populated in a partitioned NAPI slot may operate as single socket ×8 adapter as triggered by NAPI_MODE sideband signal.

Figure 9:
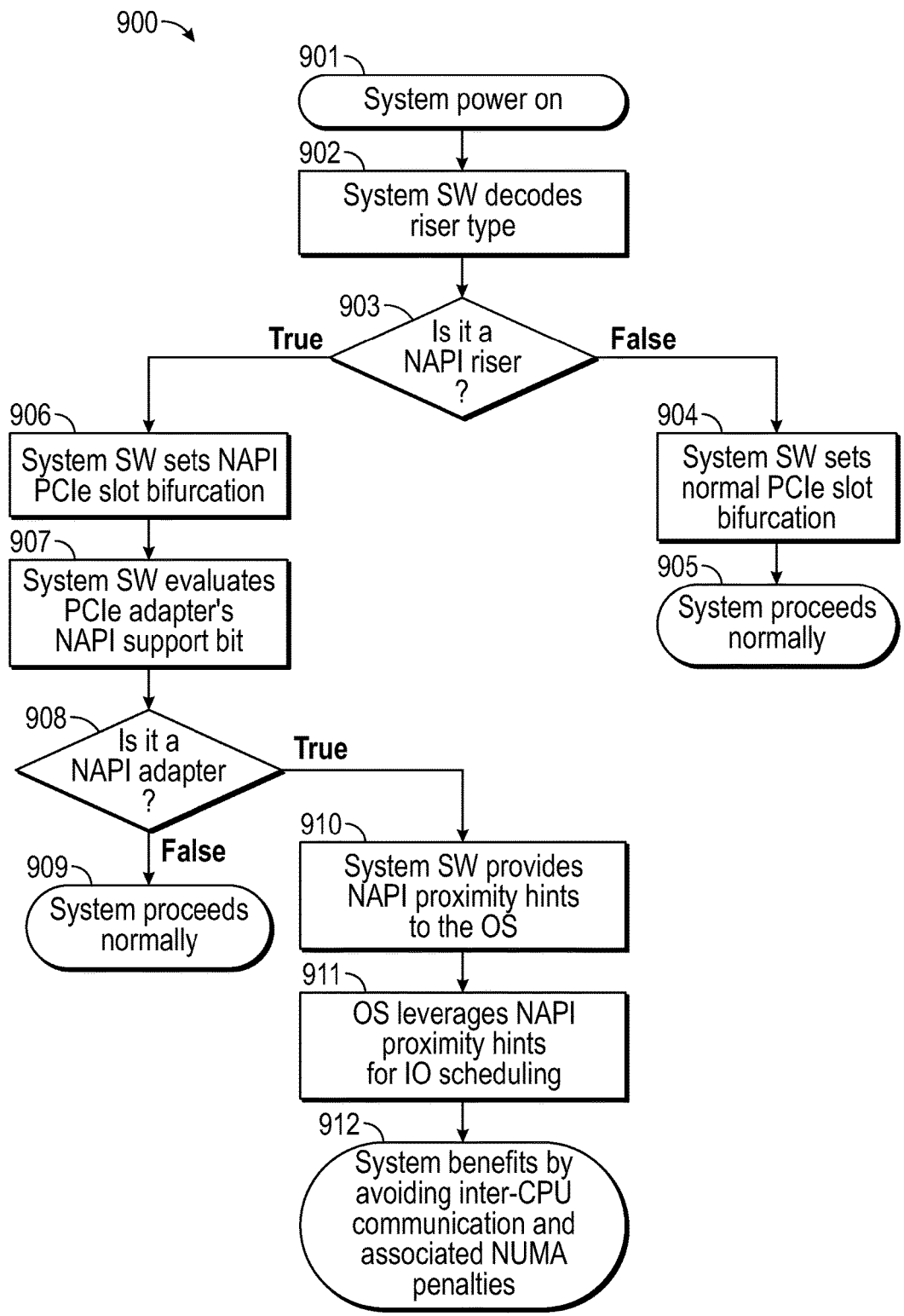
FIG. 9 a flowchart of an example of a method for operating a NAPI system according to some embodiments.

FIG. 9 is a flowchart of an example of method 900 for operating a NAPI riser card 130 according to some embodiments. At block 901, the IHS is powered on. At block 902, method 900 decodes the RISER_TYPE sideband signal received from a card inserted into a PCIe slot. Then, at block 903, method 900 determines whether the RISER_TYPE sideband signal indicates the presence of a NAPI riser card in a PCIe slot.

If the result of block 903 is false, the IHS sets a normal PCIe slot bifurcation at block 904, and then proceeds normally at block 905. Conversely, if the result of block 903 is true, block 906 sets NAPI PCIe slot bifurcation.

In a conventional bifurcation, a PCIe adapter negotiates with a single PCIe root-complex (e.g., CPU) to train a maximum possible width link at the highest possible speed according to PCI SIG specifications. In case of a two-way NAPI bifurcation, however, the adapter and the system are aware of the presence of two independently trainable NAPI adapter partitions and two independently trainable PCIe root-complexes, thereby establishing two links of maximum possible width and speed. As such, in contrast with a conventional bifurcation, in this case a NAPI bifurcation (of a NAPI adapter and enabled system) may establish two independent PCIe links to and communicate directly to each CPU from a single PCIe slot adapter.

For example, an ACPI_PXM command may be used to identify which PCIe slot is local to a specific CPU or NUMA node. For a NAPI adapter, where a first ×8 I/O device is connected off of CPU 102A and a second ×8 I/O device is connected off of CPU 102B (in this particular scenario, a ×16 slot is bifurcated into 2 ×8s, one for each CPU), block 906 may define two virtual slots (instead of a single conventional, static PCIe slot entry).

For instance, instead of creating a PCIe Slot 2 entry, BIOS ACPI code may create two separate entries for PCIe Slot 2A and PCIe Slot 2B in response to detecting the presence of NAPI riser and slot in the IHS. Each of these 2A and 2B slots has a respective ACPI entry, including a PXM/proximity domain entry, which in turn enables the OS and device driver to spawn interrupts/threads on CPU 102A for I/O device 2A usage threads and concurrently on CPU 102B for I/O device 2B usage interrupts/threads.

For scenarios where NAPI adapter includes more than 2 NUMA domain-affinitized I/O devices, corresponding changes to BIOS ACPI and _PXM may be made to enable the OS and/or a virtual machine hypervisor to automatically steer selected CPU cores for their respective local I/O usage, thereby improving or optimizing performance.

Back to FIG. 9, at block 907 method 900 evaluates a PCIe adapter's NAPI support bit. Block 908 determines, based upon the support bit, whether the adapter is a NAPI adapter. If not, control passes to block 909 and the IHS proceeds normally. If so, block 910 provides NUMA I/O hints to the OS. For example, in the case of a NAPI-aware dual port network adapter, each port is local to a separate CPU socket. The BIOS provides NUMA I/O hints via the _PXM mechanism for each port, which shows up as a different PCIe device.

At block 911, the OS leverages NUMA I/O proximity hints for I/O scheduling. Workload threads utilizing a NAPI-aware adapter in a NAPI riser are steered to cores on the local NUMA node via the BIOS_PXM hint. In the case of a dual-port NIC, each port is local to a different CPU socket in a 2 socket system, and workload threads communicating across a specific NIC port are steered to the local CPU socket for computing resources and memory. As a result, at block 912, the IHS benefits by avoiding or reducing inter-CPU communications and associated NUMA penalties.

In one or more embodiments, techniques described herein may provide a number of improvements over conventional technologies. For example, embodiments of systems and methods described herein may, in response to detection/ presence of NAPI riser/adapter, create virtual PCIe slots (sub-slots) by the BIOS, and report the corresponding NUMA node affinity for vPCI slots/sub-slots via ACPI_PXM constructs, therefore enabling an OS to automatically direct CPU codes for local I/O affinity.

Additionally or alternatively, these systems and methods may enable an IHS to use socket direct and other similar CPU direct solutions without being tied to a single vendor's implementation. Additionally or alternatively, these systems and methods may further: provide an enhanced inter-processor interconnect solution without sacrificing any other interconnect slots; enable PCIe lanes sharing from multiple sockets in a single-CPU scenario; provide flexibility for non-NIC devices (e.g., NVMe, Accelerators, host bus adapters (HBAs), etc.); enable targeted design to enable specialized per-workload platforms (HFT/HPC); and/or allow for a single part number NIC to support either NAPI or standard PCIe (the adapter senses the NAPI riser and initializes in NAPI mode, otherwise it comes up in standard PCIe mode).

For customers who often have to purchase one high-speed adapter per socket to deal with NUMA I/O locality, a single adapter can provide the same performance in many cases, while reducing costs, complexity, and power utilization. In addition, extra high-density High Performance Computing (HPC) server designs can benefit by having a single high-speed NIC adapter (or expensive FPGA adapters) local to each CPU socket, thus saving costs of ultra-high speed switch ports.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor comprising a first core and a second core;
a memory coupled to the processor, the memory having program instructions stored thereon that, upon execution, cause the IHS to enable an Input/Output (I/O) device to communicate directly with the first core and the second core utilizing a single interconnect slot; and
a Basic Input/Output System (BIOS) coupled to the processor, the BIOS having program instructions stored thereon that, upon execution, cause the IHS to associate two or more interconnect slot entries with the single interconnect slot, wherein a first interconnect slot entry includes a first proximity domain construct that allows the first core to spawn a first interrupt or thread directed to a first portion of the single interconnect slot, and wherein a second interconnect slot entry includes a second proximity domain construct that allows the second core to spawn a second interrupt or thread directed to a second portion of the single interconnect slot.

2. The IHS of claim 1, wherein the first and second cores access a single I/O device coupled to the single interconnect slot.

3. The IHS of claim 1, wherein the program instructions, upon execution, further cause the IHS to enable the first core and the second core to communicate with the I/O device via the single interconnect slot in the absence of link traversal operations between the first core and the second core.

4. The IHS of claim 1, wherein the first core and the second core share a non-volatile memory (NVM) bridge adapter.

5. The IHS of claim 4, wherein the program instructions, upon execution, further cause the IHS to reduce latency of communication between (a) the first and second cores and (b) the NVM bridge adapter.

6. The IHS of claim 1, further comprising a Basic Input/Output System (BIOS) coupled to the processor, the BIOS having program instructions stored thereon that, upon execution, cause the IHS to identify a type of the single interconnect slot.

7. A hardware memory device having program instructions stored thereon that, upon execution by an Information Handling System (IHS) having a processor comprising a first core and a second core, cause the IHS to:
    associate two or more interconnect slot entries with an interconnect slot, wherein a first interconnect slot entry includes a first proximity domain construct that allows the first core to spawn a first interrupt or thread directed to a first portion of the interconnect slot, and wherein a second interconnect slot entry includes a second proximity domain construct that allows the second core to spawn a second interrupt or thread directed to a second portion of the interconnect slot;
    enable the first core to communicate directly with an Input/Output (I/O) device via an interconnect slot; and
    enable the second core to communicate directly with the I/O device via the interconnect slot.

8. The hardware memory device of claim 7, wherein the direct communications exclude link traversal operations between the first core and the second core.

9. The hardware memory device of claim 7, wherein the first core and the second core share a non-volatile memory (NVM) bridge adapter.

10. The hardware memory device of claim 9, wherein the program instructions, upon execution, further cause the IHS to reduce latency of communication between (a) the first and second cores and (b) the NVM bridge adapter.

11. In an Information Handling System (IHS) having comprising a processor having at least a first core and a second core, a method comprising:
    associating two or more interconnect slot entries with the interconnect slot, wherein a first interconnect slot entry includes a first proximity domain construct that allows the first core to spawn a first interrupt or thread directed to a first portion of the interconnect slot, and wherein a second interconnect slot entry includes a second proximity domain construct that allows the second core to spawn a second interrupt or thread directed to a second portion of the interconnect slot;
    enabling the first core to communicate directly with an Input/Output (I/O) device via an interconnect slot; and
    enabling the second core to communicate directly with the I/O device via the interconnect slot.

12. The method of claim 11, wherein the direct communications exclude link traversal operations between the first core and the second core.

13. The method of claim 11, wherein the first core and the second core share a non-volatile memory (NVM) bridge adapter.

14. The method of claim 13, further comprising reducing latency of communication between (a) the first and second cores and (b) the NVM bridge adapter.

* * * * *